United States Patent
Chaudoreille et al.

[11] Patent Number: 5,955,805
[45] Date of Patent: Sep. 21, 1999

[54] MOTOR VEHICLE ALTERNATOR HAVING A WATER COOLED REAR BEARING

[75] Inventors: Alain Chaudoreille, Paris; Michel Le Douarin, Creteil, both of France

[73] Assignee: Valeo Equipements Electriques Moteur, Creteil, France

[21] Appl. No.: 08/990,995

[22] Filed: Dec. 15, 1997

[30] Foreign Application Priority Data

Dec. 16, 1996 [FR] France .................................. 96 15544

[51] Int. Cl.[6] .............................. H02K 5/16; H02K 5/20; H02K 11/04; H02K 9/19
[52] U.S. Cl. .............................. 310/90; 310/54; 310/68 D
[58] Field of Search .................................. 310/54, 68 D, 310/90, 68 R

[56] References Cited

U.S. PATENT DOCUMENTS

| 4,221,982 | 9/1980 | Raver et al. ................. | 310/54 |
| 4,262,224 | 4/1981 | Kofink et al. ................. | 310/54 |
| 5,293,089 | 3/1994 | Frister ........................ | 310/54 |
| 5,640,062 | 6/1997 | Yockey ..................... | 310/68 D |

FOREIGN PATENT DOCUMENTS

| 49735 | 4/1982 | European Pat. Off. ......... | 310/68 D |
| 0 480 484 | 4/1992 | European Pat. Off. . | |
| 2 667 738 | 4/1992 | France . | |
| 2810222 | 9/1979 | Germany ................. | 310/54 |
| 2-211038 | 8/1990 | Japan ..................... | 310/54 |
| 3-251065 | 11/1991 | Japan ..................... | 310/54 |
| 3-273847 | 12/1991 | Japan ..................... | 310/54 |
| 2 217 924 | 11/1989 | United Kingdom . | |

OTHER PUBLICATIONS

French Search Report dated Aug. 18, 1997.

*Primary Examiner*—Clayton LaBalle
*Attorney, Agent, or Firm*—Morgan & Finnegan, L.L.P.

[57] ABSTRACT

A liquid cooled alternator comprising a casing, one end of which is closed by a rear bearing which carries a rectifier bridge for rectifying the alternating current produced by the alternator, the bearing having an internal cavity in which a coolant liquid flows. The bearing is formed with at least one chimney element which is open axially at both axial ends of the bearing. These chimney elements extend through the internal cavity of the bearing, so that an outer face of a side wall of the chimney element is in contact with the coolant liquid flowing in the cavity. At least one component of the rectifier bridge is mounted within at least one corresponding chimney element.

27 Claims, 6 Drawing Sheets

MOTOR VEHICLE ALTERNATOR HAVING A WATER COOLED REAR BEARING

FIELD OF THE INVENTION

This invention relates to motor vehicle alternators of the kind including a rear bearing which is liquid cooled. More particularly, the invention relates to liquid cooled alternators of the type comprising a casing, one axial end of which is closed by a rear bearing that carries regulating means for regulating the current produced by the alternator (typically a rectifier), the alternator being further of the type in which the bearing has an internal cavity in which a coolant liquid flows.

BACKGROUND OF THE INVENTION

It is known to arrange for flow of coolant liquid within a cavity formed either in the casing of the alternator or in a bearing of the alternator, so as to cool the latter effectively. This enables both the power output and the compactness of such a machine to be improved. In addition, as compared with cooling by air ventilation, the cooling of the machine by use of a liquid is significantly more silent.

The use of a liquid cooling circuit for the alternator is therefore of particular relevance in the context of the current tendency for continuously increasing the demand for electrical energy in motor vehicles, which is due to the steady increase in the number of auxiliary items of equipment that have electric motors. This increase in the demand for current to be produced by the alternator leads to a need for corresponding adaptation of the current regulating means, and particularly of a means whereby the three-phase alternating current produced by the alternator is rectified, into a direct current, which can be stored in a battery of the vehicle or be used directly by the electrical circuit of the vehicle which is supplied with a direct-current voltage.

Rectification of the three-phase alternating current is generally obtained by means of a rectifier bridge having six power diodes. Three of these diodes are the positive diodes, and are connected between the outlets of the stator windings of the alternator and the positive terminal B+ of the alternator which is connected to the battery and the electrical circuit of the vehicle. Three further diodes, namely the negative diodes, are connected between electrical ground or earth of the vehicle and the input side of the stator windings.

The diodes which nowadays constitute the rectifier bridge are subjected to high current intensities. Hence, it is necessary to cool them in the most effective way possible. To this end, it is known to arrange the diodes on metal plates, which are arranged on the outside of the alternator and which constitute a dissipator for the heat produced by the diodes. The diodes are accordingly grouped on two plates, one of which is reserved for the positive diodes, and the other for the negative diodes.

However, under certain particularly severe operating conditions, it has become apparent that this cooling of the diodes, and in general terms the cooling of the whole of the current regulating means, can be insufficient to ensure good performance of the alternator.

DISCUSSION OF THE INVENTION

An object of the invention is to improve the cooling of the components of the current regulating means for regulating the current produced by the alternator.

According to the invention, a liquid cooled alternator, of the type comprising a casing, one axial end of which is closed by a rear bearing that carries means for regulating the current produced by the alternator, the alternator being further of the type in which the bearing has an internal cavity in which a coolant liquid flows, is characterised in that the bearing has at least one chimney element which is open axially at each axial end of the bearing, and which extends through the internal cavity, in such a way that an external face of a side wall of at least one chimney element is in contact with the coolant liquid, and in that the regulating means comprise at least one component which is disposed inside the chimney element.

According to a preferred feature of the invention, the said component (which may be, for example, a diode of a rectifier bridge) includes a body which is mounted in contact with an internal face of the side wall of the corresponding chimney element.

According to another preferred feature of the invention each component is disposed substantially at the level of an internal transverse face of the bearing, and includes a connecting element which extends axially within the corresponding chimney element and out of the bearing, to terminate on the same side as an external transverse face of the bearing, so as to enable the component to be connected electrically to further parts of the regulating means.

Preferably, the axial end or each chimney element that is open in the internal face of the bearing is widened so as to receive the body of the corresponding component therein.

In preferred embodiments of the invention, the internal cavity of the bearing constitutes a channel, the two ends of which constitute the inlet and outlet, respectively, for coolant liquid flowing in the cavity, each chimney element being so disposed as to extend across the path of the liquid flowing in the cavity.

Preferably, the bearing comprises a main body in which the cavity and chimney element or elements are formed, together with a cover plate which closes off the cavity and which includes a passage hole constituting one axial end of the or each chimney element.

The cover plate is preferably arranged on the outside of the bearing, i.e. the side remote from the casing of the alternator.

In other embodiments of the invention, the bearing is molded in one piece.

The bearing may include ears for enabling air to flow between the inside and the outside of the alternator.

Further features and advantages of the invention will appear more clearly on a reading of the following detailed description of a preferred embodiment of the invention, which is given by way of non-limiting example only and with reference to the accompanying drawings.

DESCRIPTION OF A PREFERRED EMBODIMENT OF THE INVENTION

Figure 1:
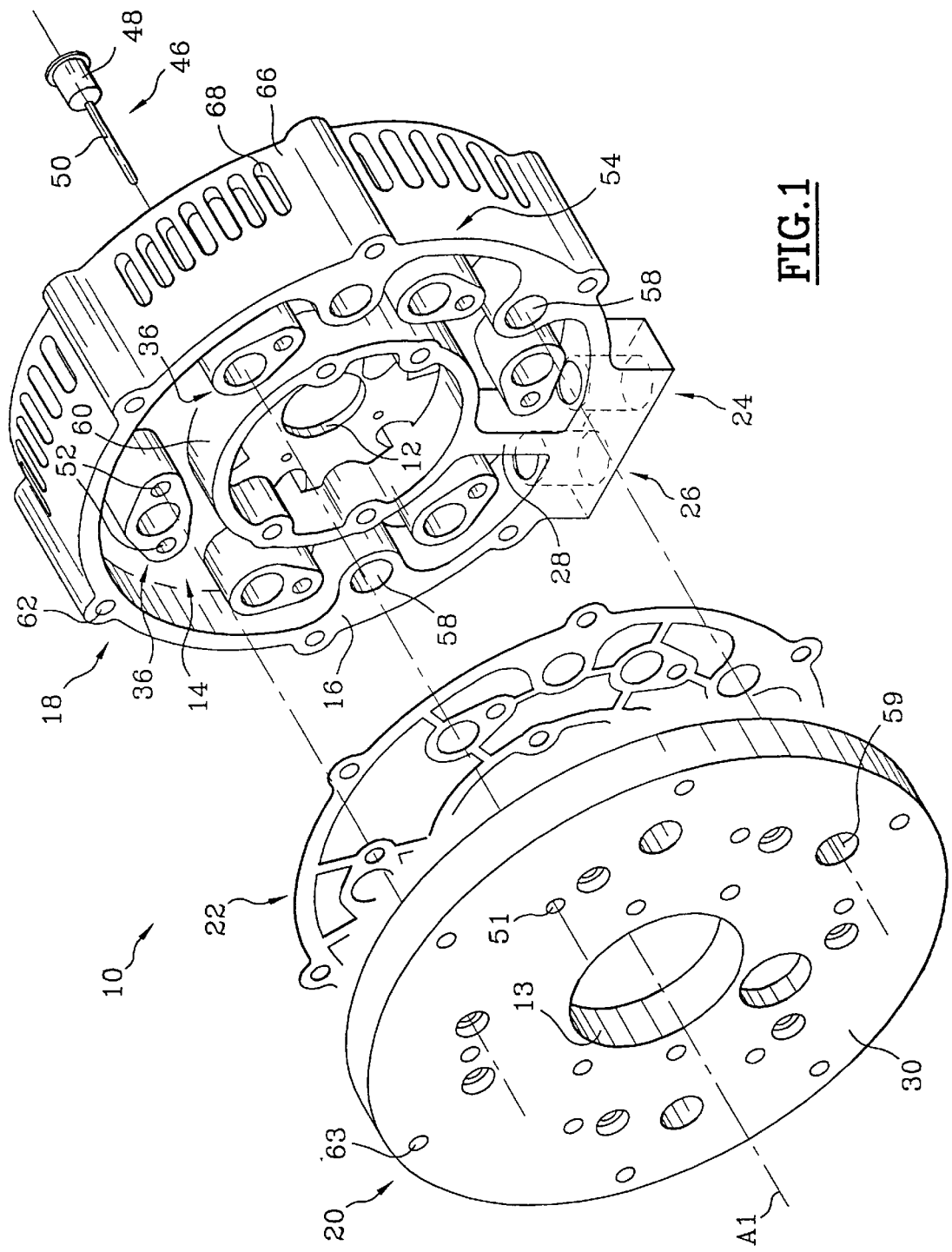
FIG. 1 is an exploded perspective view of a bearing in accordance with features of the invention.
Figure 2:
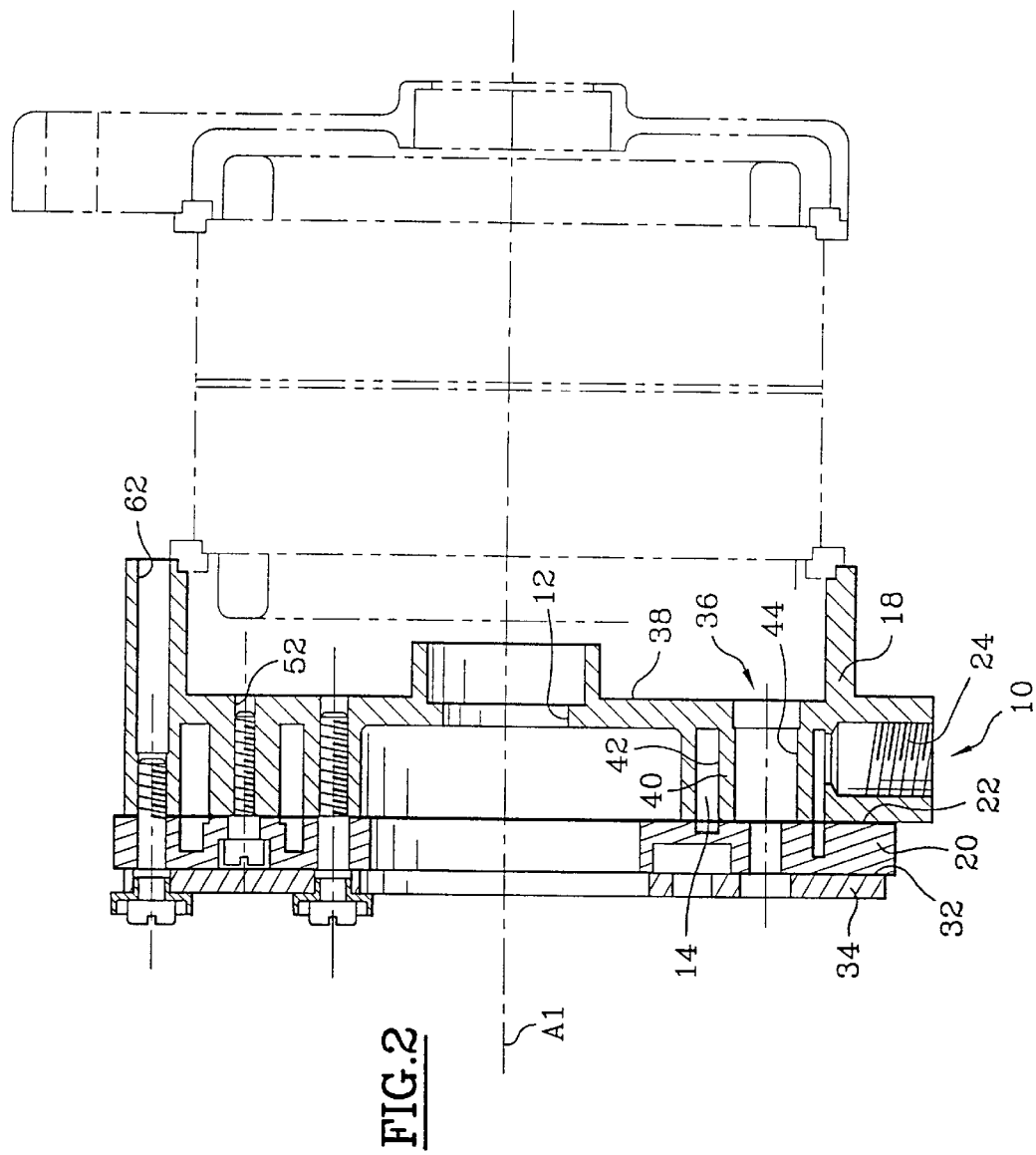
FIG. 2 is a view in axial cross section taken on the line 2—2 in FIG. 3, showing the bearing of FIG. 1 mounted on an alternator and having, on an outer face, a dissipator for a rectifier bridge.

Reference is first made to FIG. 1, which shows a bearing 10 adapted to be fixed to a rear axial end of a motor vehicle alternator, the outlines of which are shown in phantom lines in FIG. 2. The bearing 10 closes off the rear end of the casing of the alternator, and it also constitutes a guide for a rotor shaft (not shown), on the alternator axis A1. This alternator rotor shaft extends through a central hole 12 in the bearing 10.

The bearing 10 has an internal cavity 14 which is formed in the outer or external face 16 of a main body 18 of the bearing 10. The bearing also includes a cover plate 20, which closes off the internal cavity 14, with a sealing gasket 22 being interposed.

Figure 6:
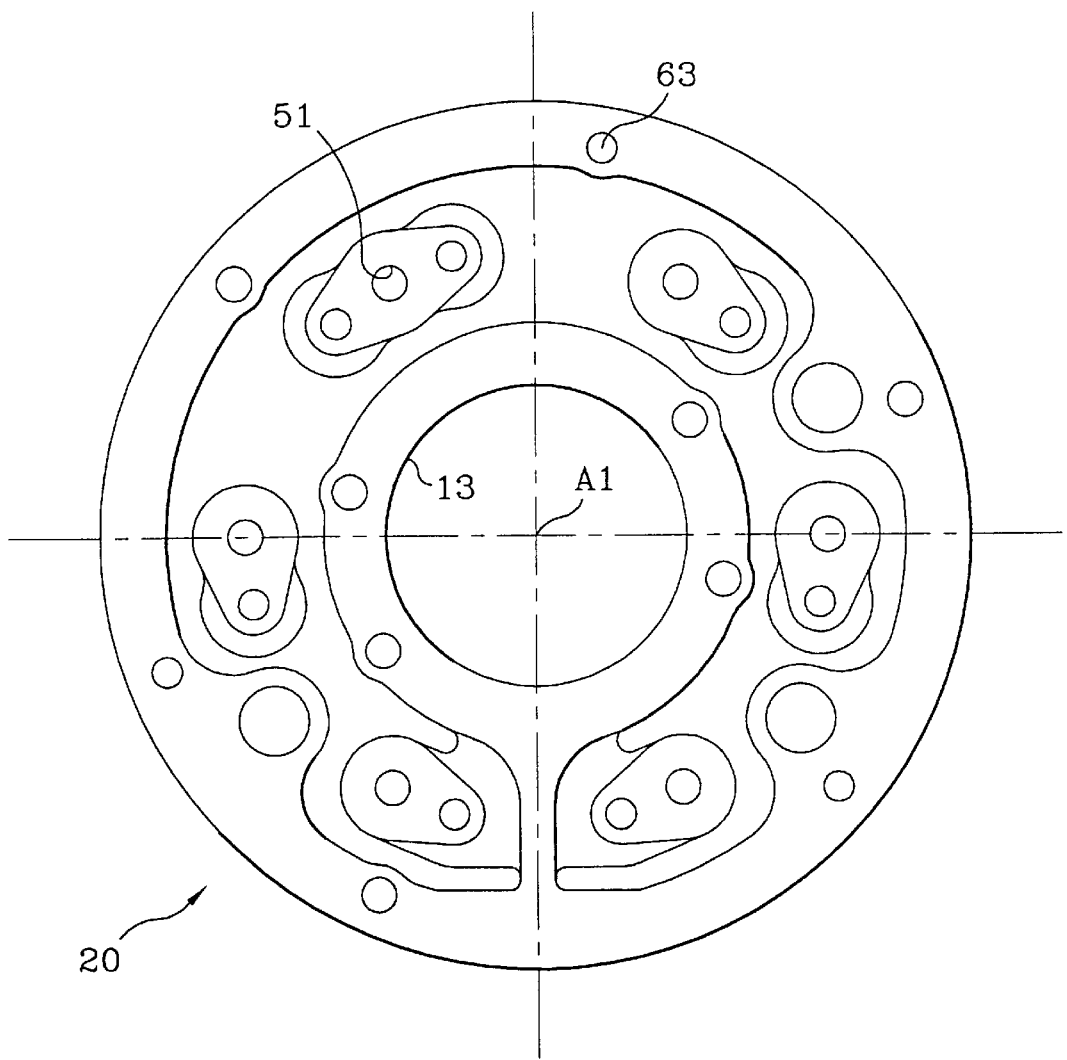
FIG. 6 is a view in axial elevation on the plane of the inner face of the cover plate of the bearing, which is arranged to close off the cavity.

FIG. 6 shows the inner, or internal, face of the cover plate 20 that closes off the cavity 14. The sealing gasket 22 is engaged on this internal face. The cover plate 20 is substantially in the form of an annular plate, the central aperture 13 of which provides access to the central hole 12 of the bearing 10. The cavity 14 extends essentially around the periphery of the bearing 10, and the main body 18 of the latter has an inlet 24 and an outlet 26 which enable coolant liquid to be passed into and out of the cavity 14.

The cavity 14 is bounded on its radially outward side by an external side wall 54 of the bearing 10, in which axial through holes 62 are formed. Assembly screws are received in these axial fastening holes, for securing the cover plate 20 on the main body 18. Alternatively, the fastening members that pass through these fastening holes 62 may consist of tensioned fastening bolts that secure the bearing 10 on the remainder of the alternator. The cover plate 20 has corresponding axial holes 63.

The external side wall 54 is also formed with axial passages 58, corresponding with further passages 59 in the cover plate 20. These passages 58 are open at both axial ends of the bearing 10, so as to enable wires of the stator winding of the alternator (not shown) to pass through. There are three of these wires, corresponding to the three phases of the alternator: they are arranged to be connected to the current regulating means of the alternator.

The cavity 14 is also bound on its radially outward side by an internal, or inner, side wall 60 which surrounds the central hole 12 of the bearing 10, and in which there are formed points for fastening of the cover plate 20 on the main body 18.

Figure 3:
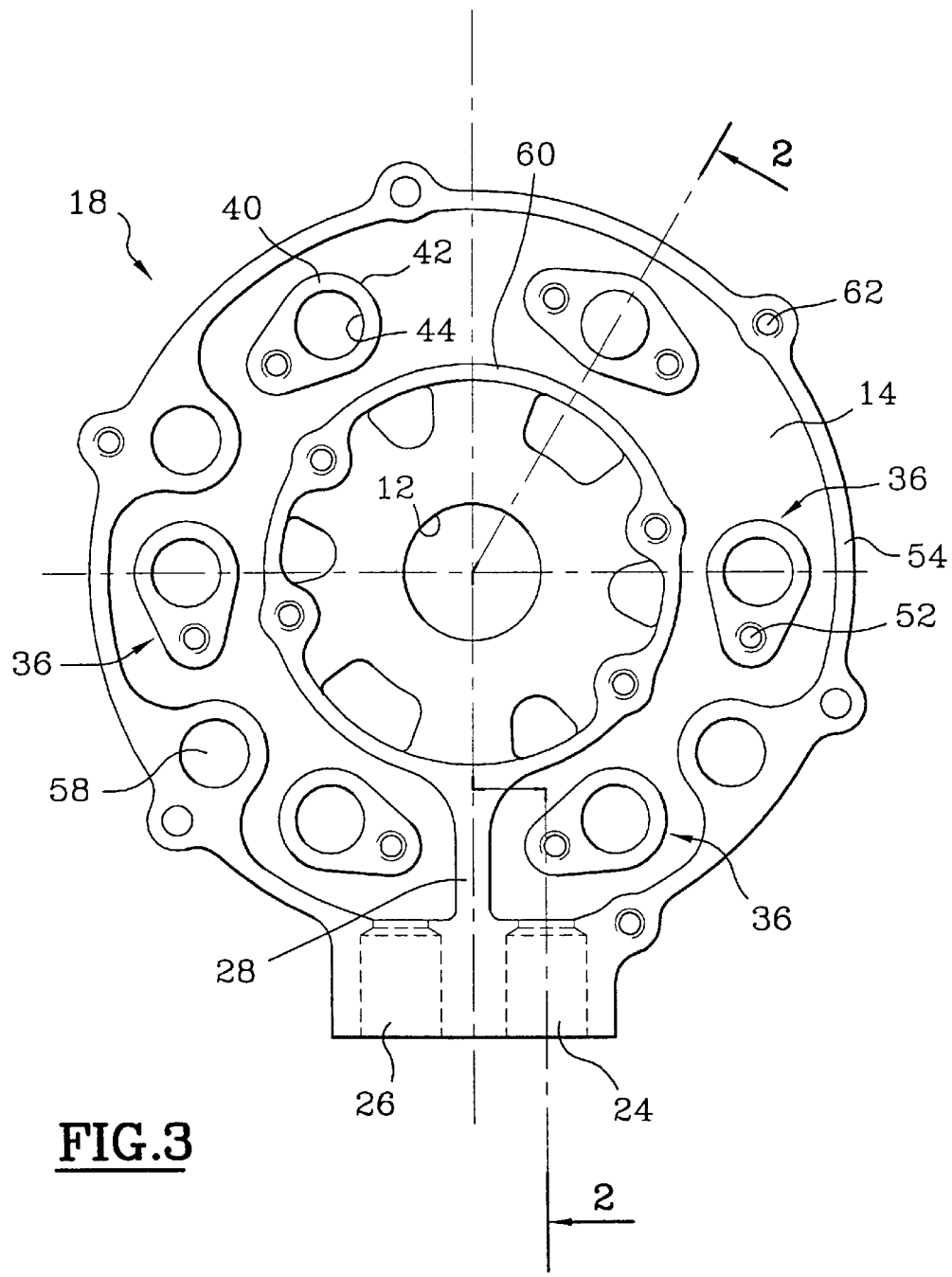
FIG. 3 is a view in axial elevation, on the plane of the outer face of the main body of the bearing in which the cavity is formed.

The cavity 14 constitutes a substantially annular channel, the two ends of which are adjacent to each other and separated from each other sealingly by a partition which, as shown in FIG. 1, consists of an integral radial partition joining the inner side wall 60 to the outer side wall 54. The coolant inlet 24 and the coolant outlet 26 are open into the respective ends of the cavity 14, on either side of the partition 28, so that the coolant fluid flows in one direction in the cavity 14, which in this example is the counterclockwise direction as shown to FIGS. 1 and 3. It will be understood that the functions of the ports 24 and 26 may be reversed so that they act as the coolant outlet and inlet respectively, and thus reversing the direction of flow of the coolant liquid in the cavity 14.

When the bearing 10 is fitted on the alternator, it is arranged so that a dissipator 34 (FIG. 2) is mounted on the outer radial face 30 (FIG. 1) of the cover plate 20.

The alternator has a rectifier bridge for rectifying the three-phase alternating current produced by the alternator, and this bridge includes positive diodes which are carried on the dissipator 34. An electrical insulator 32 is interposed between the dissipator 34 and the cover plate 20 of the bearing 10.

Other means for regulating the current produced by the alternator can be arranged on the bearing, outside the alternator in the usual way. Similarly it is possible to dispose, around the central hole 12 of the bearing 10, brush carriers (not shown) for supplying current to the rotor (not shown) of the alternator.

Figure 4:
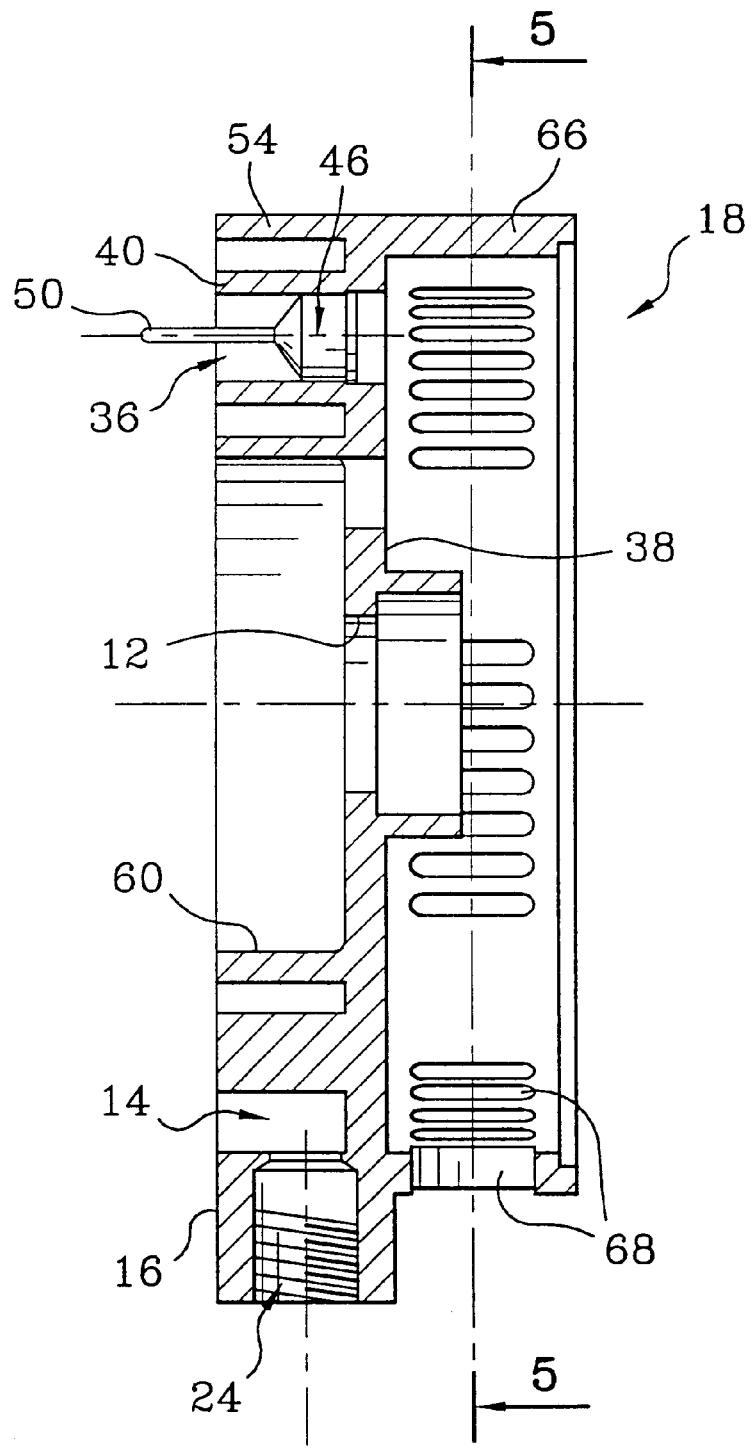
FIG. 4 is a view, in longitudinal cross section, of the main body of the bearing.
Figure 5:
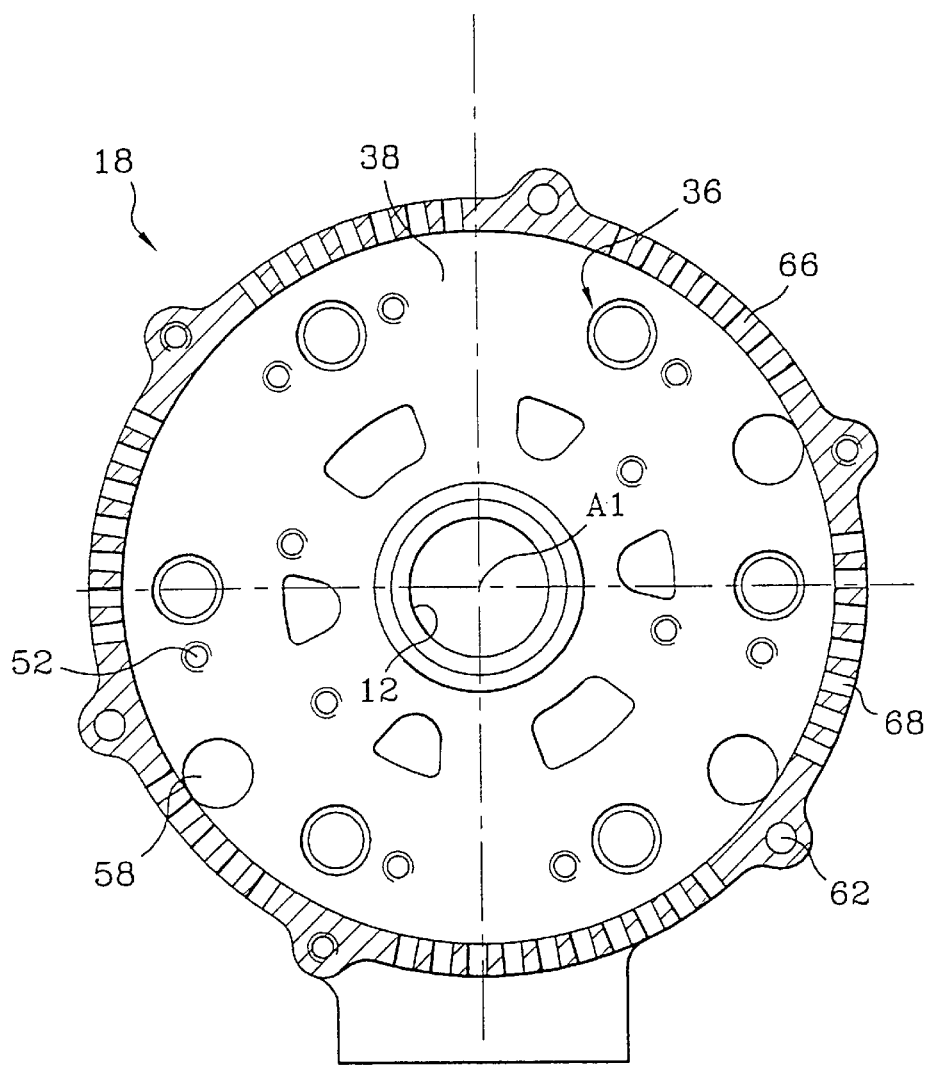
FIG. 5 is a view in cross section taken on the line 5—5 in FIG. 4.

The bearing 10 also includes chimney elements 36 which extend axially through the cavity 14, and which are open axially on either side of the bearing 10, firstly in the outer face 30 of the cover plate 20, and secondly in an internal face 38 (FIG. 2) of the main body 18 of the bearing 10. Each of these chimney elements 36 comprises a tubular wall 40, having an external face 42, which lies in the cavity 14 so as to be in contact with the coolant fluid. The internal face 44 of the wall 40 of each chimney element 36 defines a substantially cylindrical, stepped housing, which receives one of the components of the current regulating means for regulating the current produced by the alternator, for example a negative diode 46, one of which is shown in FIG. 4 in position in one of these housings.

One of these diodes 46 is also shown by itself in FIG. 1. It comprises a main body 48 which is generally formed of an electrically conductive metallic material, and which in this case is arranged to be connected to ground. The diode also has a connecting pin 50 which extends axially from the body 48. As can be seen more particularly in FIG. 4, the diodes 46 are arranged to be fitted axially, from inside to outside, within the chimney elements 36, so that the body 48 of each diode lies substantially at the inner axial end of the corresponding chimney element 36. The body 48 of the diode, which is itself substantially cylindrical, is received within the chimney element 36 in such a way that its side wall is in close contact with the internal wall 44 of the chimney element, so as to ensure both good electrical conduction and good conduction of heat between the diode 46 and the chimney element 36.

The inner axial end of each chimney element 36 has an enlarged diameter so as to match it to the exact profile of the body of the corresponding diode 46, which in this example includes a shoulder at the base of the body 48. At the other end of the body, the connecting pin 50 of each diode 46 extends axially through the chimney element 36 without touching the walls of the latter. The free end of the connecting pin 50 extends outside the bearing 10, through a hole 51 (FIG. 1) formed in the cover plate 20. Each of these holes 51 constitutes one axial end of the corresponding chimney element 36. Each diode 46 can thus be connected through its connecting pin 50 to the remainder of the components of the current rectifier bridge.

As can be seen in the drawings, the tubular walls 40 of the chimney elements 36 are not cylinders of revolution, but have thickened portions in which it is possible to form threaded axial holes 52 (FIG. 3), for receiving fastening screws for securing the cover plate 20 on the main body 18 of the bearing 10. In this way, very good sealing is absolutely ensured for the chimney elements 36, which avoids coolant liquid from seeping into the housings in which the diodes 46 are contained.

As can be seen in the drawings, there are six chimney elements 36, which enable each of the three negative diodes of a rectifier bridge of known design to be doubled up if required.

In addition, the external radial wall 54 of the main body 18 of the bearing 10 is extended axially towards the interior of the alternator, from the rear transverse face 38 of the body 18 of the bearing, by an axial skirt 66 in which slots or ears 68 are formed for ventilating the interior of the alternator. The alternator may have an internal fan arranged at its front end.

In the embodiment of the invention described above and shown in the drawings, the bearing 10 is made in two parts, namely the main body 18 and the cover plate 20, which together define the cavity 14. However, casting techniques may be used that employ gasifiable patterns, so as to enable the bearing to be made in one piece, and this does of course simplify sealing of the cavity 14.

What is claimed is:

1. A liquid cooled alternator comprising:

a casing having two axial ends;

a rear bearing closing one of the axial ends, the rear bearing defining an internal cavity for flow of a coolant liquid therein;

at least one chimney element opening axially at each axial end of the rear bearing and extending through the internal cavity, the at least one chimney element having a side wall with an external face and an internal face, the external face of the side wall is exposed in the internal cavity and is in contact with the coolant fluid in the internal cavity; and the liquid cooled alternator further including means carried by the rear bearing for regulating the current produced by the liquid cooled alternator, the current regulating means including at least one component disposed inside each chimney element.

2. The liquid cooled alternator according to claim 1, wherein the component of the current regulating means includes a body in contact with the internal face of the side wall of the chimney element.

3. The liquid cooled alternator according to claim 2, wherein the rear bearing has an internal transverse face and an external transverse face, the component in the chimney element being mounted substantially at the level of the internal transverse face of the, and the component further including a connecting element extending axially within the chimney element and terminating outside the rear bearing on the same side of the rear bearing as the external transverse face thereof, enabling the component to be connected to the other components of the current regulating means.

4. The liquid cooled alternator according to claim 3, wherein the axial end of the chimney element opening in the internal face of the rear bearing is widened to receive the body of the component of the current regulating means contained in the chimney element.

5. The liquid cooled alternator according to claim 1, wherein the rear bearing has a channel defined by the internal cavity, and includes a means for defining two ends of the channel, the ends constituting an inlet and an outlet for the coolant fluid whereby the fluid can flow in the internal cavity, and the chimney element extends across the path of the liquid in the internal cavity.

6. The liquid cooled alternator according to claim 1, wherein the rear bearing comprises a main body defining the internal cavity and at least one said chimney element, and a cover plate secured over the main body to close off the internal cavity, the cover plate having a passage hole corresponding to each said chimney element and aligned with the chimney element to constitute an axial end of the chimney element.

7. The liquid cooled according to claim 6, wherein the cover plate is disposed at the axial end of the rear bearing opposite to the axial end of the rear bearing that is connected to the casing.

8. The liquid cooled alternator according to claim 1, wherein the rear bearing is formed by a one piece molding.

9. The liquid cooled alternator according to claim 1, wherein the rear bearing further includes slots for allowing air to flow between an inside and outside portion of the liquid cooled alternator.

10. A liquid cooled alternator comprising:

a casing having two axial ends;

a rear bearing closing one of the axial ends, the rear bearing defining an internal cavity for flow of a coolant liquid therein;

at least one chimney element opening axially at each axial end of the rear bearing and extending through the internal cavity, the at least one chimney element having a side wall with an external face and an internal face, the external face of the side wall is exposed in the internal cavity and is in contact with the coolant fluid in the internal cavity; and at least one component disposed inside each chimney element for regulating the current produced by the liquid cooled alternator.

11. The liquid cooled alternator according to claim 10, wherein the component includes a body in contact with the internal face of the side wall of the chimney element.

12. The liquid cooled alternator according to claim 11, wherein the rear bearing has an internal transverse face and an external transverse face, the component in the chimney element being mounted substantially at the level of the internal transverse face of the rear bearing, and the component further including a connecting element extending axially within the chimney element and terminating outside the rear bearing on the same side of the rear bearing as the external transverse face thereof, enabling the component to be connected to the other current regulating components.

13. The liquid cooled alternator according to claim 12, wherein the axial end of the chimney element opening in the internal face of the rear bearing is widened to receive the body of the component contained in the chimney element.

14. The liquid cooled alternator according to claim 10, wherein the rear bearing has a channel defined by said internal cavity, and includes two ends of the channel, the ends constituting an inlet and an outlet for the coolant fluid, whereby the fluid can flow in the internal cavity, and the chimney element extends across the path of the liquid in the internal cavity.

15. The liquid cooled alternator according to claim 10, wherein the rear bearing comprises a main body defining the internal cavity and at least one said chimney element, and a cover plate secured over the main body to close off the internal cavity, the cover plate having a passage hole corresponding to each chimney element and aligned with the chimney element to constitute an axial end of the chimney element.

16. The liquid cooled alternator according to claim 15, wherein the cover plate is disposed at the axial end of the rear bearing opposite to the axial end of the rear bearing that is connected to the casing.

17. The liquid cooled alternator according to claim 10, wherein the rear bearing is formed by a one piece molding.

18. The liquid cooled alternator according to claim 10, wherein the rear bearing further includes slots for allowing air to flow between an inside and outside portion of the liquid cooled alternator.

19. A liquid cooled bearing for regulating current produced by an alternator of a motor vehicle, the bearing comprising:

an internal cavity for flow of a coolant liquid therein;

at least one chimney element opening axially at each axial end of the bearing and extending through the internal cavity, the at least one chimney element having a side wall with an external face and an internal face, the external face of the side wall is exposed in the internal cavity and is in contact with the coolant fluid in the internal cavity; and at least one component disposed inside each chimney element for regulating the current produced by the alternator.

20. The bearing according to claim 19, wherein the component includes a body in contact with the internal face of the side wall of the chimney element.

21. The bearing according to claim 20, wherein the axial end of the chimney element opening in the internal face of the bearing is widened to receive the body of the component contained in the chimney element.

22. The bearing according to claim 19, wherein the bearing has a channel defined by the internal cavity, and includes two ends of the channel, the ends constituting an inlet and an outlet for the coolant fluid, whereby the fluid can flow in the internal cavity, and the chimney element extends across the path of the liquid in the internal cavity.

23. The bearing according to claim 19, wherein the bearing comprises a main body defining the internal cavity and at least one said chimney element, and a cover plate secured over the main body to close off the internal cavity, the cover plate having a passage hole corresponding to each chimney element and aligned with the chimney element to constitute an axial end of the chimney element.

24. The bearing according to claim 19, wherein the bearing is formed by a one piece molding.

25. The bearing according to claim 19, wherein the bearing further includes slots for allowing air to flow between the inside and the outside of the alternator.

26. A liquid cooled alternator comprising:

a casing having two axial ends;

a rear bearing closing one of the axial ends, the rear bearing defining an internal cavity for flow of a coolant liquid therein;

the rear bearing further having an internal transverse face, an external transverse face, a channel defined by said internal cavity, and includes two ends of the channel, the ends constituting an inlet and an outlet for the coolant fluid, whereby the fluid can flow in the internal cavity;

at least one chimney element opening axially at each axial end of the rear bearing and extending through the internal cavity, the at least one chimney element having a side wall with an external face and an internal face, the external face of the side wall is exposed in the internal cavity and is in contact with the coolant fluid in the internal cavity, wherein the axial end of the chimney element opening in the internal face of the rear bearing is widened to receive the body of the component contained in the chimney element;

a main body defining the internal cavity and at least one said chimney element, and a cover plate disposed at the axial end of the rear bearing opposite to the axial end of the rear bearing that is connected to the casing and secured over the said main body to close off the internal cavity, the cover plate having a passage hole corresponding to each chimney element and aligned with the chimney element to constitute an axial end of the chimney element; and at least one component disposed inside each chimney element including a body in contact with the internal face of the side wall of the chimney element, the component being mounted substantially at the level of the internal transverse face of the rear bearing, and the component further including a connecting element extending axially within the chimney element and terminating outside the rear bearing on the same side of the rear bearing as the external transverse face thereof, enabling the component to be connected to the other current regulating components.

27. The liquid cooled alternator according to claim 26, wherein the rear bearing further includes slots for allowing air to flow between an inside and outside portion of the liquid cooled alternator.

* * * * *

UNITED STATES PATENT AND TRADEMARK OFFICE
CERTIFICATE OF CORRECTION

PATENT NO. : 5,955,805
DATED : September 21, 1999
INVENTOR(S) : Chaudoreille et al.

It is certified that error appears in the above-identified patent and that said Letters Patent is hereby corrected as shown below:

Column 5,
Line 42, delete "face of the" and insert therefore -- face of the component --.

Signed and Sealed this

Ninth Day of July, 2002

*Attest:*

*Attesting Officer*

JAMES E. ROGAN
*Director of the United States Patent and Trademark Office*